United States Patent [19]

Jordan

[11] Patent Number: 5,379,836
[45] Date of Patent: Jan. 10, 1995

[54] CLAMPS FOR USE WITH WELL TUBULARS

[75] Inventor: Leslie E. Jordan, Inverurie, United Kingdom

[73] Assignee: Ecotek Corporation, Plano, Tex.

[21] Appl. No.: 157,113

[22] PCT Filed: Apr. 5, 1993

[86] PCT No.: PCT/GB93/00714
§ 371 Date: Dec. 3, 1993
§ 102(e) Date: Dec. 3, 1993

[87] PCT Pub. No.: WO93/20327
PCT Pub. Date: Oct. 14, 1993

[30] Foreign Application Priority Data
Apr. 3, 1991 [GB] United Kingdom ............... 9207388

[51] Int. Cl.$^6$ ................................ F16L 3/10
[52] U.S. Cl. ............................ 166/241.6; 24/285; 285/137.1; 285/419
[58] Field of Search .......... 166/241.4, 241.6; 24/279, 285, 286, 20 LS, 329, 335; 285/131, 137.1, 419

[56] References Cited

U.S. PATENT DOCUMENTS

| | | | |
|---|---|---|---|
| 1,019,766 | 3/1912 | Crank | 285/137.1 X |
| 2,168,591 | 8/1939 | Tschappat | 285/131 X |
| 2,769,647 | 11/1956 | Harstick et al. | 285/137.1 X |
| 3,002,241 | 10/1961 | Scurlock | 285/137.1 |
| 3,740,801 | 6/1973 | Sears, Jr. et al. | 285/137.1 X |
| 3,937,498 | 2/1976 | Weinhold | 285/137.1 X |
| 4,059,872 | 11/1977 | Delesandri | 24/279 X |
| 4,445,255 | 5/1984 | Olejak | 24/279 X |
| 4,492,005 | 1/1985 | Begley et al. | 24/279 X |
| 5,121,946 | 6/1992 | Jardine | 285/373 X |
| 5,271,648 | 12/1993 | Krausz | 285/419 |

FOREIGN PATENT DOCUMENTS

| | | |
|---|---|---|
| 0125015 | 11/1984 | European Pat. Off. . |
| 2090906 | 7/1982 | United Kingdom . |
| 2149000 | 6/1985 | United Kingdom . |
| 2201177 | 8/1988 | United Kingdom . |

Primary Examiner—William P. Neuder
Attorney, Agent, or Firm—Florence U. Reynolds

[57] ABSTRACT

The clamp mounts a cable and service lines in spaced relationship to a tubing string used in producing a well, and formed of lengths of tubing joined by a coupling. The clamp comprises first and second clamping elements for clamping around the tubing string and hinged on a first pin. A cover is hinged to the first element by a second pin. The first element and the inner surface of the cover are provided with formations which ensure that the cable and service lines are firmly held when the cover is closed against the first element by a captive bolt, which also clamps the first and second elements firmly around the coupling. A single hinge pin version clamps to the tubing string on each side of a coupling.

20 Claims, 6 Drawing Sheets

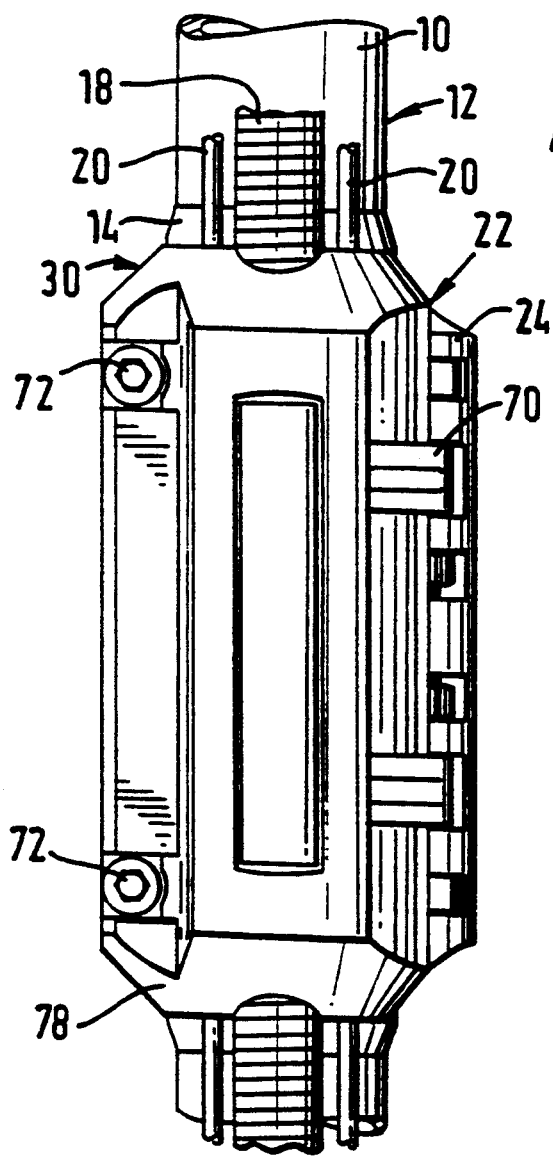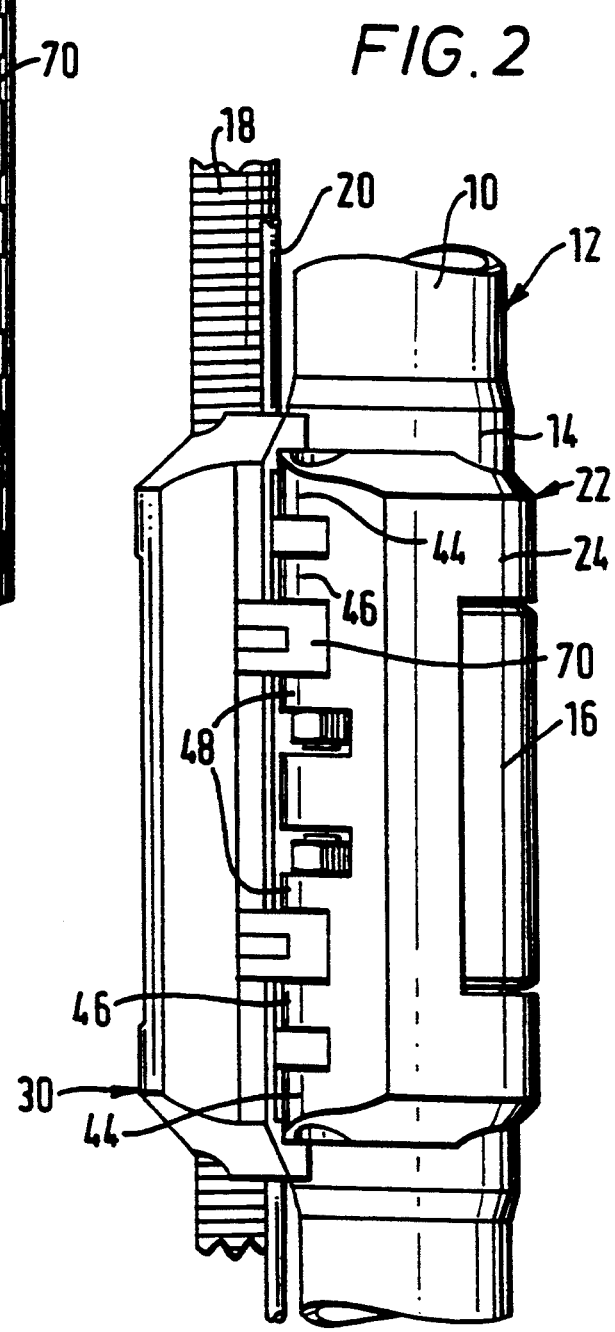

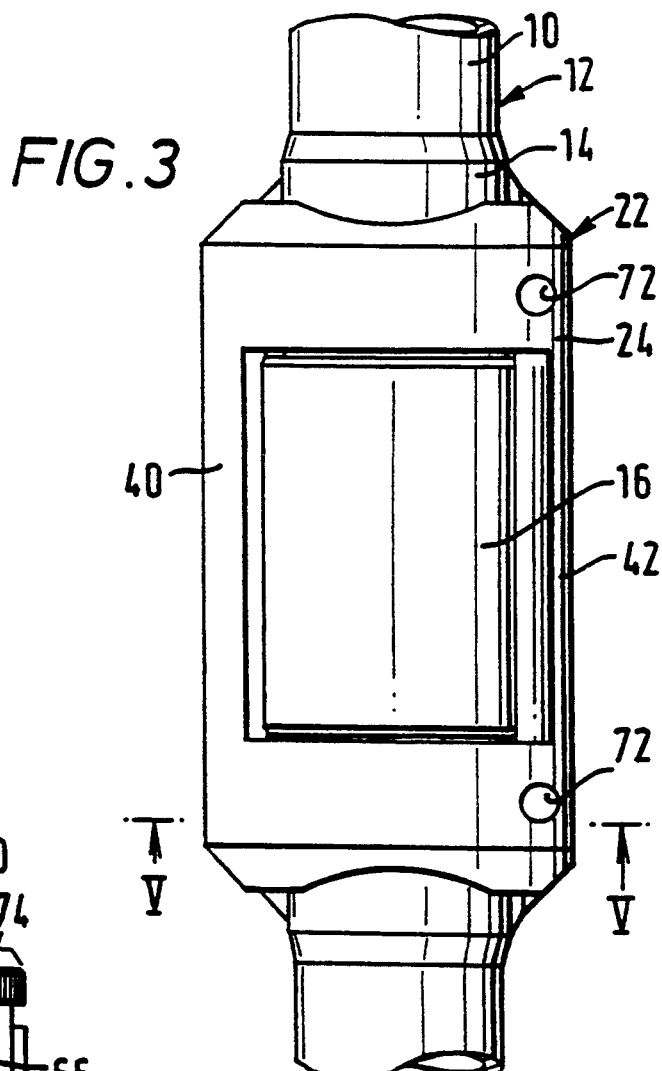
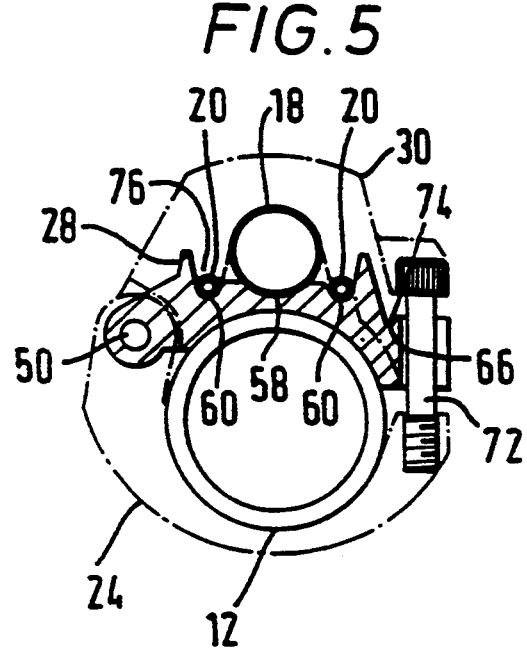
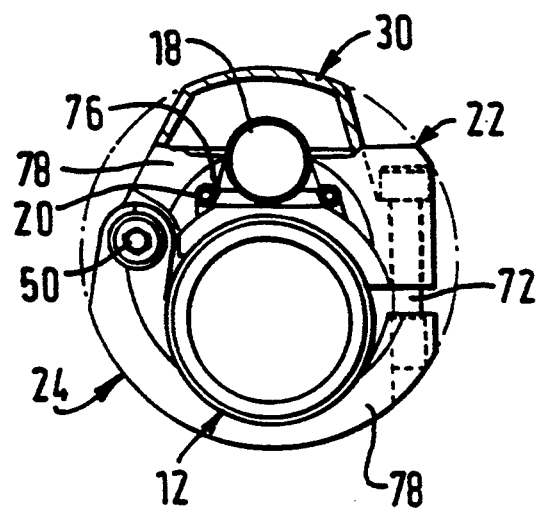

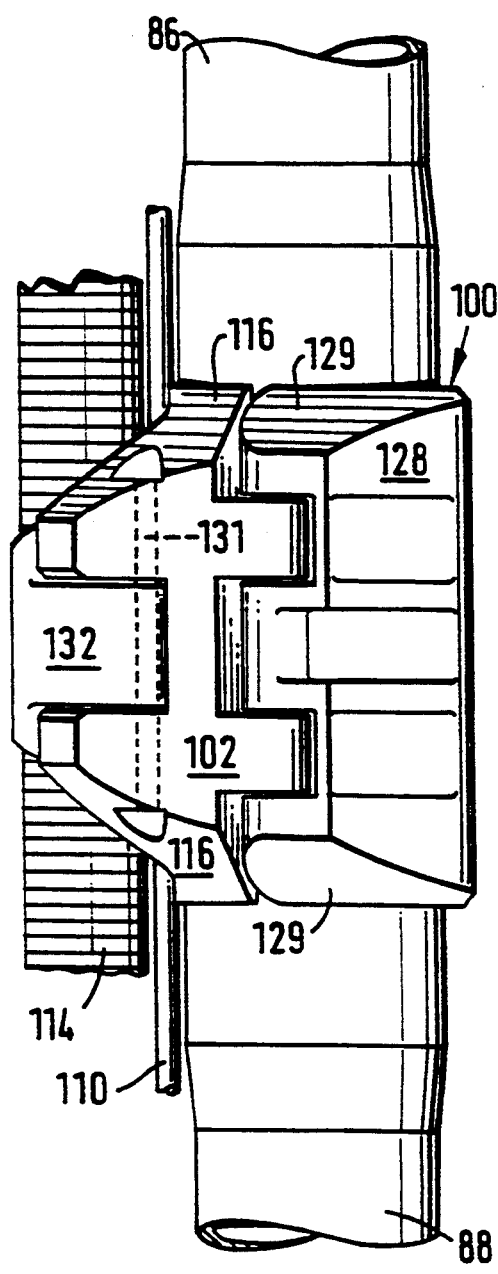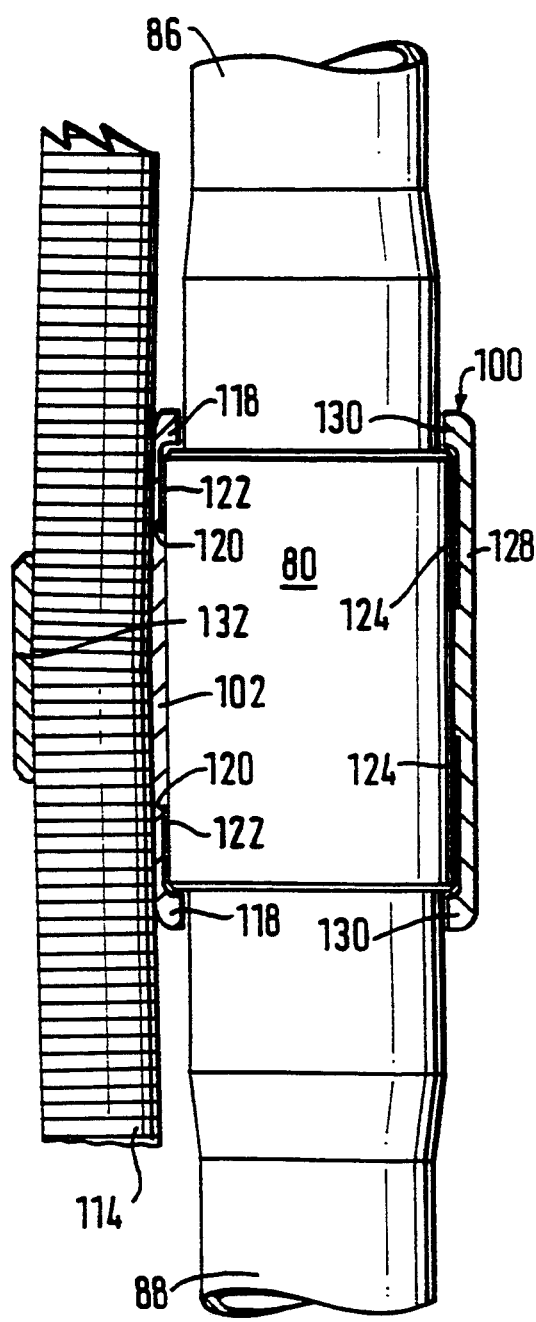

CLAMPS FOR USE WITH WELL TUBULARS

BACKGROUND OF THE INVENTION

This invention relates to clamps for use with completion or production tubing strings deployed in oil, gas or water wells.

The completion of a well using tubing conveyed tools and the subsequent production thereof with or without the use of a submersible pump suspended on a production tubing string require the installation of an electric power cable and/or service lines, for example control or injection lines, alongside the tubing string. Clearly, these cable and/or service lines are liable to be damaged during running-in and removal from the well, particularly by crushing from side loads imposed by movement in deviated wells.

It is common practice to use clamps to maintain the cable and/or lines in a pre-determined path in the space between the tubing string and the well casing, the clamps either being secured to the tubing string between couplings or spanning a coupling. Such clamps, as described for example in UK Patent Application No 2 149 000 A (Lasalle) reduce the tensile stresses to which the cable and service lines are subject by virtue of their own weight. However, conventional clamps function by compressing the cable and service lines against the tubing string. This arrangement has the drawback that the contact surfaces between the cable and lines and the tubing string are quite limited, and the support afforded is dependent on the actual diameter of the tubing string.

SUMMARY OF THE INVENTION

It is an aim of the present invention to overcome the above-mentioned drawbacks of known clamps by divorcing the tubing string clamping function from the cable and service line clamping function.

According to the present invention there is provided a clamp for mounting a cable or service line in spaced relationship to a tubing string used in producing a well and formed of lengths of tubing joined by a coupling or other type of connection, the clamp comprising first and second clamping elements for clamping around the tubing string, the elements being mutually hinged at one side and provided with releasable fastening means at the opposite side, and a cover hinged at one side of the first element and provided with releasable fastening means for releasably fastening it to the first element at the other side, the outer surface of the first element and the inner surface of the cover being provided with formations which ensure that the power and/or service lines are firmly held when the cover is closed against the first element.

According to one preferred embodiment of the present invention the second clamping element comprises a clamp body providing two seating surfaces, each arranged to engage respective adjacent lengths of tubing above and below a connection, the first clamping element comprises two clamp straps each hinged at one end to the clamp body opposite a respective one of the seating surfaces, the clamp straps being formed with recesses to receive at least one power and/or service line, the cover is hinged to the clamp body and has an internal profile which in the clamping condition urges the power and/or service lines against the clamping straps, and the releasable fastening means are arranged for tightening the clamp straps against the clamp body to secure the clamp to the tubing string, and for tightening the cover against the clamp straps to secure the power and/or service lines to the clamp.

Preferably, the clamp strap is provided with a tongue which in the closed condition of the clamp is received in a recess in the second element, thus locking the first and second clamp in the closed position when the clamp is engaged around the tubing string. The clamp cover can thus be opened without disturbing the clamp straps, for example to enable a power cable and service lines to be positioned in the recesses on the outside of the clamp straps, which are thus exposed.

According to a second preferred embodiment of the invention the first and second clamping elements are arranged to clamp around the connector itself, rather than clamp around adjacent lengths of tubing and to span the connector; also, the second clamping element and the cover are each hinged to the first clamping element by separate axes, thus enabling the clamp to be removed from the connector while maintaining the clamp and service lines captive between the cover and the first element.

To improve the resistance of the clamp cover to deformation by heavy loads and consequent relaxing of the grip on the cable, the cover and first clamping element are preferably provided with formations which inter-engage in the closed condition of the cover.

Although the large area of contact between the tubing string and clamping elements provides good resistance to relative turning movement, the seating surfaces of the clamp may, where extra high loads are expected to be encountered, be textured to maximizes the clamping effect on the tubing string.

The clamp according to the present invention allows the contact area between the cable and service lines, and the engaging surfaces on the first clamping element and cover to be maximized, thus affording the best possible grip on the cable and lines; moreover, as the size and shape of the apertures through which the cable and lines pass are independent of the tubing string tolerances, they may be chosen to afford the best possible grip.

By their novel construction clamps according to the present invention are thus able to impart, to power cables and service lines, the maximum resistance to both longitudinal and rotational movement.

BRIEF DESCRIPTION OF THE DRAWINGS

Although the invention may be carried out in a variety of ways, two particular embodiments thereof will now be described, by way of example, with reference to the accompanying drawings in which FIG. 1 is a front elevation of a clamp according to a first embodiment of the present invention positioned around a coupling connecting two lengths of a production tubing string;

FIG. 2 is a side elevation of the clamp of FIG. 1;

FIG. 3 is a rear elevation of the clamp of FIG. 1;

FIG. 4 is an underside plan of the clamp of FIG. 1 partly broken away;

FIG. 5 is a section on the line V—V of FIG. 3;

FIG. 11 is a side elevation of the clamp of FIG. 10.

FIG. 12 is an elevation corresponding to FIG. 11 but showing the clamp in axial section; and, FIG. 13 is an underside plan of the clamp of FIGS. 10 to 12.

DETAILED DESCRIPTION

Figure 6:
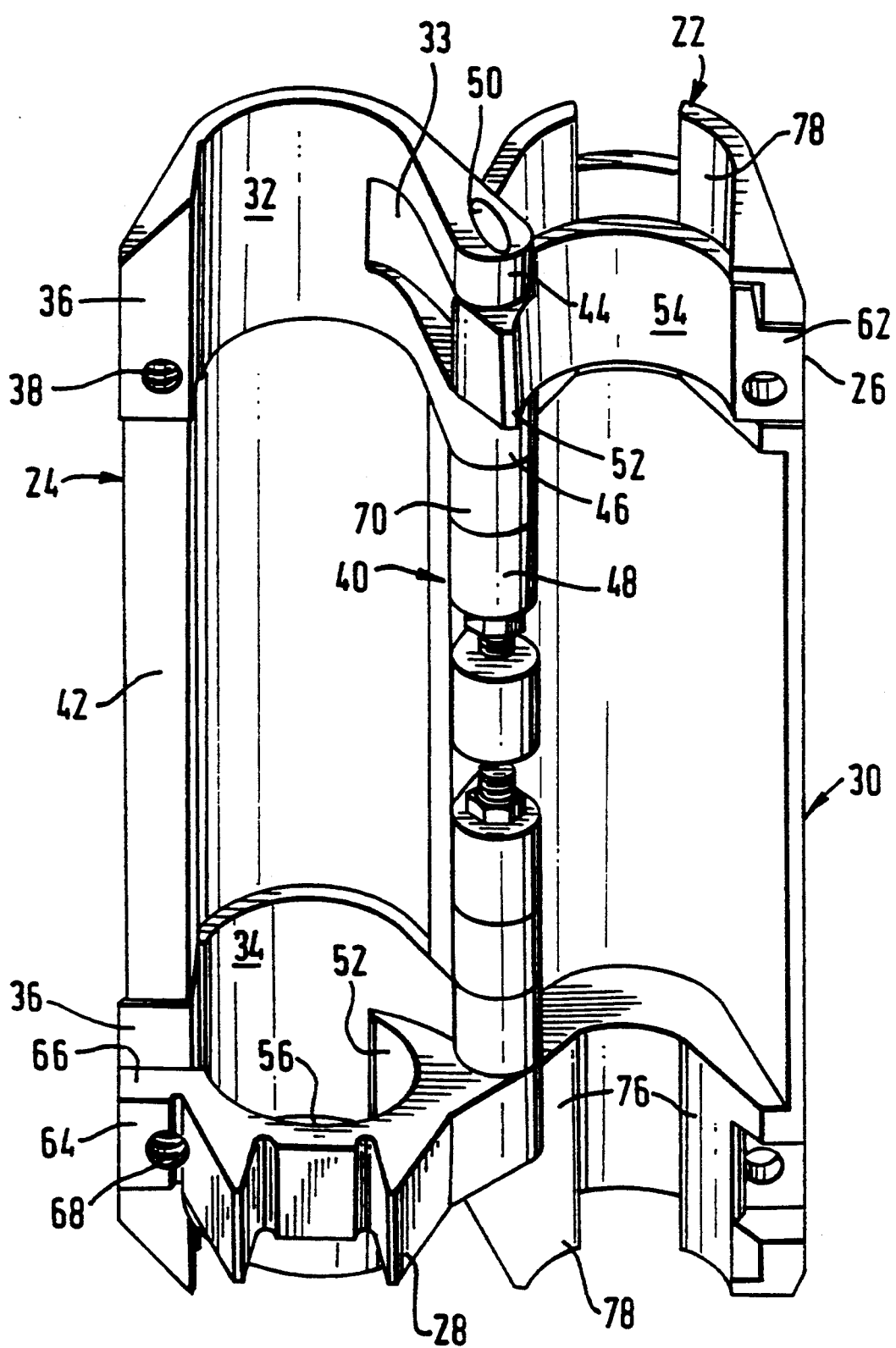
FIG. 6 is a perspective view of the clamp with the cover and upper clamp strap in the open position.

As best shown in FIGS. 1 to 3 lengths 10 of an oil or water well production tubing string 12 have enlarged end portions 14 connected by a conventional coupling 16. The production tubing string 12 is positioned within a well casing (not shown), and has running alongside it an electric power cable 18 and two service lines 20. A clamp 22, which maintains the cable 18 and lines 20 in spaced relationship with the tubing string 12, and which essentially comprises a clamp body 24, an upper clamp strap 26, a lower clamp strap 28 hinged to the body 24, and a cover 30, also hinged to the body 24, will now be described in more detail.

The clamp body 24 comprises upper and lower internally semi-cylindrical portions 32,34 which engage the enlarged end portions 14 of the tubing string lengths 10 and are each provided with a recess 33, a clamp strap seating face 36 and a threaded drilling 38, for purposes to be described. The portions 32,34 are joined by integral longitudinal side pieces 40,42, the side piece 40 being formed at each end with a series of three lugs 44,46,48 which are drilled longitudinally to receive a hinge bolt 50, on which the respective clamp straps 26,28, and the cover 30 are hinged, the clamp straps 26,28 each having its inner, hinged end received between the respective lugs 44 and 46; the inner ends are each formed with a tongue 52 which in the closed condition of the clamp 22 seats in the recess 33. Each clamp strap 26,28 has an internally-cylindrical surface 54,56 which complements the respective portions 32,34 on the clamp body 24 and engages around the respective tubing string end portion 14. The outside of the body of each clamp strap 26,28 is profiled (see FIG. 5), there being a shallow central, longitudinal channel 58 for receiving the cable 18 flanked by two relatively deep grooves 60 with a raised outer wall, each for receiving a service line 20.

The outer end of each of the clamping straps 26,28 is formed on the inside with a flat face 62 for seating against the face 36 on the clamp body 24, and on the outside within a seating face 64 and a recess 66; furthermore each outer end is drilled at 68 to align in the closed position with one of the drillings 38.

The cover 30 is also hinged to the bolt 50, the hinge projections 70 being received between the respective lugs 46,48, and is maintained in the closed position by captive screws 72 which pass through the drillings 68 in the clamp straps 26,28 and engage in the threaded drillings 38 in the clamp body 24. To strengthen the location of the cover 30 in relation to the clamp straps 26,28, it is formed with projections 74 which engage in the respective recesses 66. As best seen in FIGS. 4, 5 and 6, the cover 30 is formed at each end with profiled internal projections 76 which clamp the cable 18 and lines 20 securely against the profile on the respective clamping strap 26,28: and at each end the cover 30 is also formed with a skirt 78 contoured to fit snugly around the cable 18 and lines 20.

It will be appreciated that the profile on the cover 30 may be altered to accommodate different cross-sectional shapes and dimensions of cable and service lines.

While the open central portion of the clamp body 24 and the design of the cover 30 enable the clamp 22 to be used, as described, in a cross-coupling application, it may also of course be used in a mid-joint location.

Figure 7:
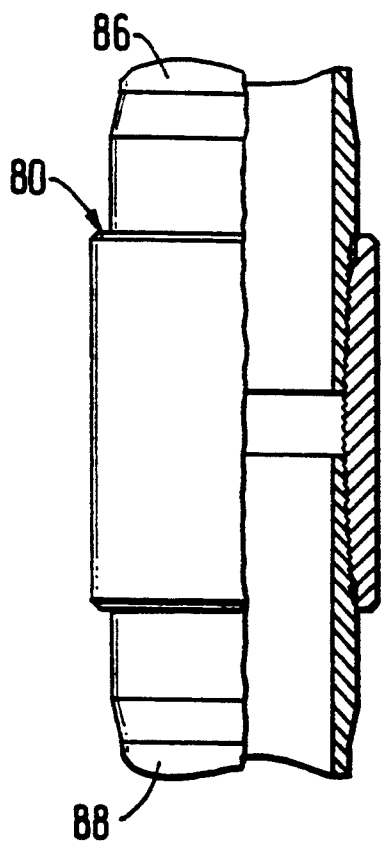
FIGS. 7 to 9 are each a side elevation, partly in axial section, of a typical known coupling.
Figure 8:
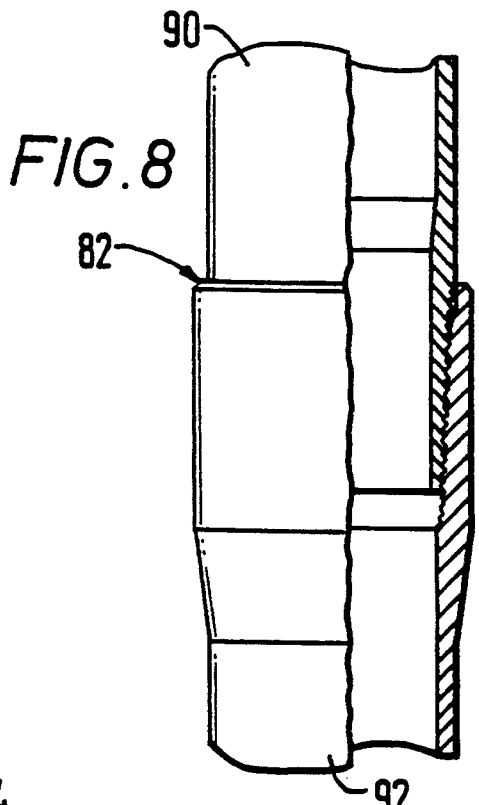
Figure 9:
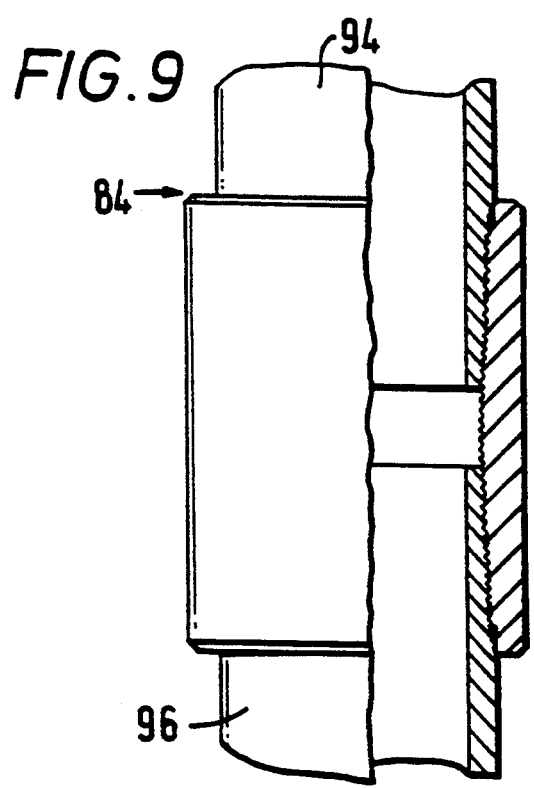
Figure 10:
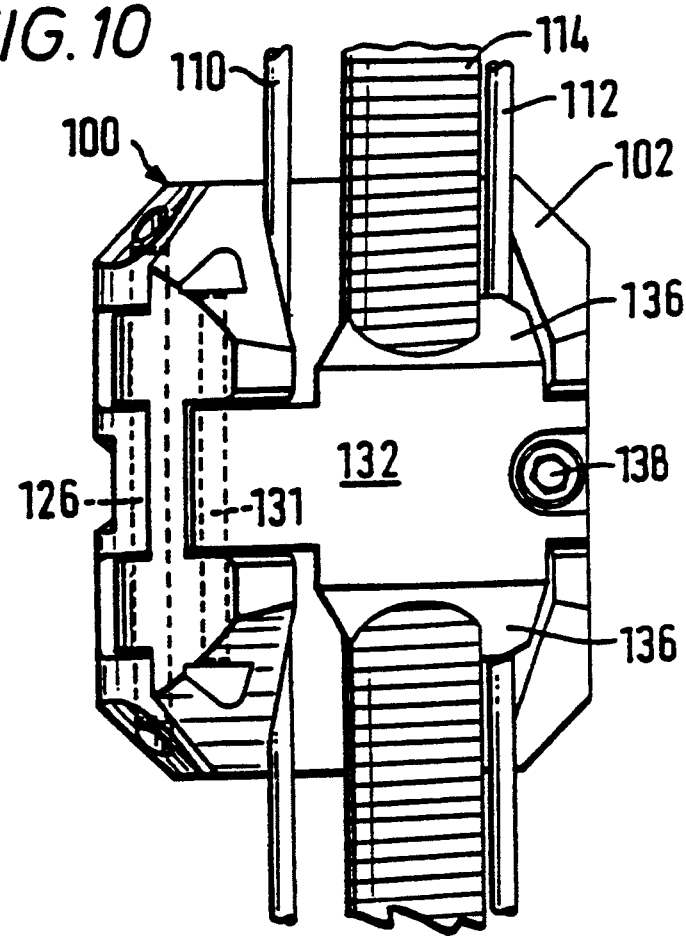
FIG. 10 is a front elevation, corresponding to that of FIG. 1, of a clamp according to the second embodiment of the invention.
Figure 13:
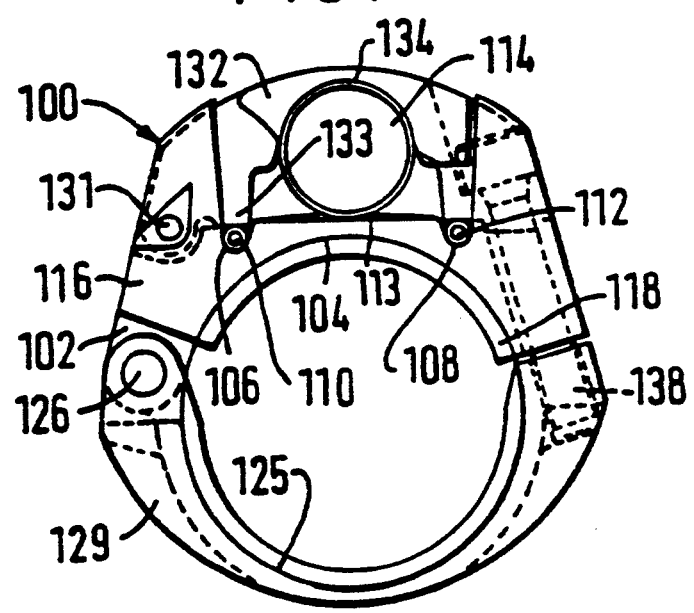

FIGS. 7 to 9 show alternative forms of coupling 80, 82 and 84 joining respective end portions 86,88; 90,92; and 94,96 of three different types of tubing string. The couplings 80,82 and 84 may be spanned by the above-described clamp 22 or, alternatively, each may be directly clamped by a clamp 100 shown in FIGS. 10 to 13 and now to be described.

The clamp 100 comprises a first clamping element 102 providing an arcuate seating surface 104 for engaging one of the couplings 80,84 and is provided on its outer surface with recesses 106,108 for receiving service lines (e.g. injector and/or control lines) 110, 112, respectively. A shallow raised trough 113 runs centrally between the recesses 106,108 for locating an ESP cable 114. At each end the element 102 is formed with conical surfaces 116 which prevent hangup during running in or pulling out operations, the ends each being formed with an inwardly projecting lip 118 which limits or prevents any axial movement of the clamp 100 relative to the coupling 80,82,84. Where extra high loading is likely to be encountered the seating surface 104 is recessed at 120 (FIG. 12) to accommodate respective layers 122,124 of friction coating.

Hinged to the element 102 by a first pivot pin 126 is a second, complementary clamping element 128, similarly formed with conical end surfaces 129, projecting lips 130 and inset friction layers 124 in a seating surface 125.

Also hinged to the first element 102 by a second, smaller diameter pivot pin 131 is a cable cover 132 formed internally with projecting formations 133 for reception in the respective recesses 106,108, and with an arcuate-section recess 134 for receiving the outer portion of the cable 114. Externally, the upper and lower ends of the cover 132 are again formed with conical surfaces 136 to facilitate passage over any snags. The configuration of the cover may be appropriately chosen to suit different diameters of service lines and cable.

The elements 102,128 and cover 132 are all clamped together by a single large diameter bolt 138, captive in the cable cover 132.

It will be appreciated that the clamp 100 is of very compact construction which minimizes radial enlargement of the coupling. Moreover, the seating surfaces 104,125 are in contact with the surface of the coupling over 88% of its circumference, thus providing very good resistance to radial movement.

I claim:

1. A clamp for mounting a cable or service line in spaced relationship to a tubing string used in producing a well and formed of lengths of tubing joined by a coupling or other type of connection, the clamp comprising first and second clamping elements for clamping around the tubing string, the elements being mutually hinged at one side and provided with releasable fastening means at the opposite side, and a cover hinged at one side of the first element and provided with releasable fastening means for releasably fastening it to the first element at the other side, the outer surface of the cover and the inner surface of the cover being provided with formations which ensure that the power and/or service lines are firmly held when the cover is closed against the first element.

2. A clamp as claimed in claim 1, in which the first and second elements are each provided with two seating surfaces, each arranged to engage a respective length of tubing above and below a connection.

3. A clamp as claimed in claim 2 in which the intervening portions of the elements are apertured or recessed to accommodate the connection.

4. A clamp as claimed in claim 2, in which the first element is provided with a tongue which in the closed condition of the clamp is received in a recess in the second element, thus maintaining the first and second elements in the closed position when the clamp is engaged around the tubing string.

5. A clamp as claimed in claim 1, in which the first and second elements are each provided with a seating surface for engagement around a connection.

6. A clamp as claimed in claim 5, in which the elements include means to prevent or limit axial movement relative to the connection.

7. A clamp as claimed in claim 1, in which the first and second elements and the cover are hinged about a common axis.

8. A clamp as claimed in claim 1, in which the first and second elements, and the first element and the cover, are hinged about different axes.

9. A clamp as claimed in claim 1, in which the fastening means are common to the first and second element and the cover.

10. A clamp as claimed in claim 1, in which the seating surfaces of the first and second elements are textured to maximize the clamping effect on the tubing string.

11. A clamp as claimed in claim 1, in which the formations are arranged to inter-engage in the closed condition of the cover.

12. A clamp as claimed in claim 2, in which the first and second elements, and the first element and the cover, are hinged about different axes.

13. A clamp as claimed in claim 3, in which the first and second elements, and the first element and the cover, are hinged about different axes.

14. A clamp as claimed in claim 4, in which the first and second elements, and the first element and the cover, are hinged about different axes.

15. A clamp as claimed in claim 5, in which the first and second elements, and the first element and the cover, are hinged about different axes.

16. A clamp as claimed in claim 6, in which the first and second elements, and the first element and the cover, are hinged about different axes.

17. A clamp as claimed in claim 8, in which the fastening means are common to the first and second element and the cover.

18. A clamp as claimed in claim 8, in which the seating surfaces of the first and second elements are textured to maximize the clamping effect on the tubing string.

19. A clamp as claimed in claim 4, in which the formations are arranged to inter-engage in the closed condition of the cover.

20. A clamp as claimed in claim 8, in which the formations are arranged to inter-engage in the closed condition of the cover.

* * * * *